(12) United States Patent
Fuhse

(10) Patent No.: US 12,344,022 B2
(45) Date of Patent: Jul. 1, 2025

(54) OPTICALLY VARIABLE SECURITY ELEMENT

(71) Applicant: GIESECKE+DEVRIENT CURRENCY TECHNOLOGY GMBH, Munich (DE)

(72) Inventor: Christian Fuhse, Otterfing (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 31 days.

(21) Appl. No.: 17/796,959

(22) PCT Filed: Jan. 18, 2021

(86) PCT No.: PCT/EP2021/025014
§ 371 (c)(1),
(2) Date: Aug. 2, 2022

(87) PCT Pub. No.: WO2021/155999
PCT Pub. Date: Aug. 12, 2021

(65) Prior Publication Data
US 2023/0057603 A1 Feb. 23, 2023

(30) Foreign Application Priority Data
Feb. 4, 2020 (DE) .................... 10 2020 000 732.5

(51) Int. Cl.
*B42D 25/324* (2014.01)
*B42D 25/29* (2014.01)
(Continued)

(52) U.S. Cl.
CPC .......... *B42D 25/29* (2014.10); *B42D 25/324* (2014.10); *B42D 25/328* (2014.10);
(Continued)

(58) Field of Classification Search
CPC .................................................. B42D 25/324
See application file for complete search history.

(56) References Cited

U.S. PATENT DOCUMENTS

| 6,060,143 A | 5/2000 | Tompkin et al. |
| 9,176,266 B2 | 11/2015 | Fuhse et al. |
| (Continued) | | |

FOREIGN PATENT DOCUMENTS

| CH | 691750 A5 | 9/2001 |
| DE | 102018112652 A1 * | 11/2019 |
| (Continued) | | |

OTHER PUBLICATIONS

DE-102018112652-A1 English Translation (Year: 2019).*
(Continued)

*Primary Examiner* — Kyle R Grabowski
(74) *Attorney, Agent, or Firm* — Workman Nydegger

(57) ABSTRACT

An optically variable security element is provided for protecting objects of value. The reflective area region includes two independent relief structures, which are arranged at different levels in the z-direction and form a lower-level relief structure and a higher-level relief structure. The higher-level relief structure is supplied with a first reflection-enhancing coating following the relief profile, and the lower-level relief structure is supplied with a second reflection-enhancing coating following the relief profile. The first reflection-enhancing coating is formed in the visible spectral range with a reflection and transmission in the visible spectral range, so that the higher-level relief structure shows a first optically variable effect in a first color, and the lower-level relief structure shows a second optically variable effect through the first reflection-enhancing coating, wherein the second optically variable effect shows itself in a second, different color.

16 Claims, 3 Drawing Sheets

(51) Int. Cl.
*B42D 25/328* (2014.01)
*B42D 25/351* (2014.01)
*B42D 25/373* (2014.01)
*B42D 25/425* (2014.01)
*G02B 5/08* (2006.01)
*G02B 5/09* (2006.01)
*G02B 27/06* (2006.01)

(52) U.S. Cl.
CPC ......... *B42D 25/351* (2014.10); *B42D 25/373* (2014.10); *B42D 25/425* (2014.10); *G02B 5/085* (2013.01); *G02B 5/09* (2013.01); *G02B 27/06* (2013.01)

(56) References Cited

U.S. PATENT DOCUMENTS

| | | | |
|---|---|---|---|
| 2005/0170259 A1* | 8/2005 | Holmes | G03H 1/0244 430/1 |
| 2007/0081246 A1* | 4/2007 | Stuck | B42D 25/29 359/568 |
| 2010/0045024 A1 | 2/2010 | Attner et al. | |
| 2012/0319395 A1 | 12/2012 | Fuhse et al. | |
| 2015/0352887 A1 | 12/2015 | Holmes | |
| 2021/0268825 A1 | 9/2021 | Scherer et al. | |

FOREIGN PATENT DOCUMENTS

| | | | | |
|---|---|---|---|---|
| DE | 102018005447 A1 | | 1/2020 | |
| EP | 1775142 A1 | | 4/2007 | |
| EP | 3216620 A1 | | 9/2017 | |
| EP | 3415964 A1 | | 12/2018 | |
| WO | WO-2017138536 A1 | * | 8/2017 | ........... B42D 25/324 |
| WO | WO-2019182050 A1 | * | 9/2019 | ............. B42D 25/29 |
| WO | 2020011390 A1 | | 1/2020 | |
| WO | 2020011392 A1 | | 1/2020 | |

OTHER PUBLICATIONS

German Search Report from corresponding German Application No. 10 2020 000 732.5, Oct. 2, 2020.
International Search Report from corresponding PCT Application No. PCT/EP2021/025014, Apr. 29, 2021.

* cited by examiner

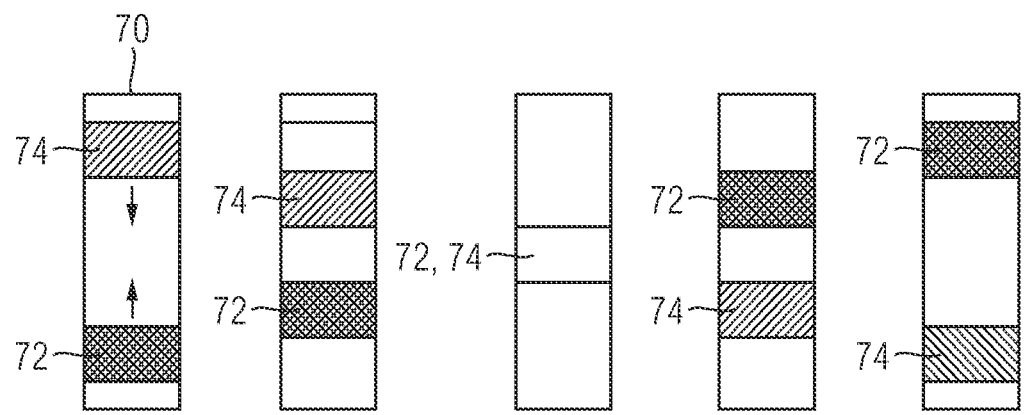
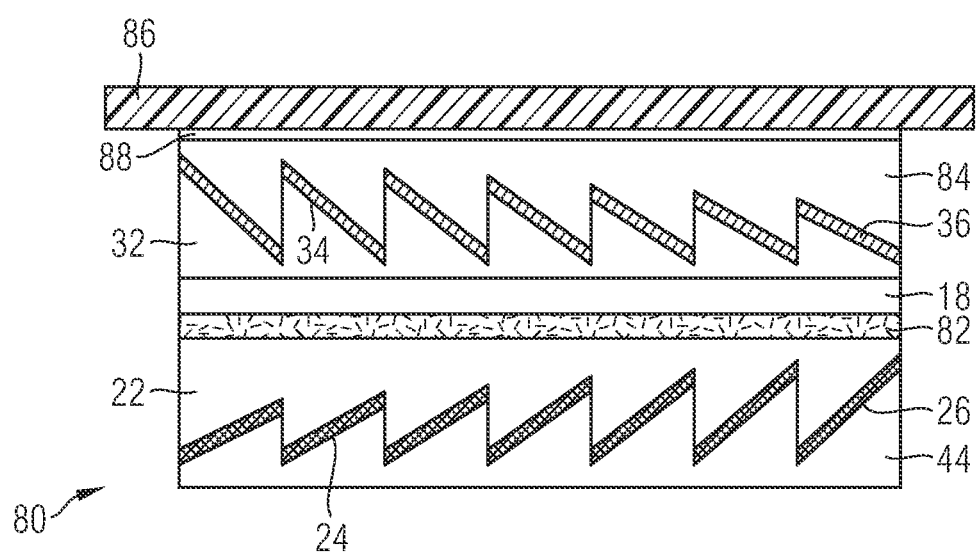
Fig. 6

OPTICALLY VARIABLE SECURITY ELEMENT

BACKGROUND

The invention relates to an optically variable security element for protecting objects of value with a reflective area region that shows at least two optically variable effects recognizable from different viewing directions. The invention also relates to a method for manufacturing such a security element and a data carrier equipped with such a security element.

Data carriers, such as value documents or identity documents, but also other value objects, such as branded articles for instance, are often supplied for securing purposes with security elements which permit a verification of the authenticity of the data carrier and which at the same time serve as protection from unauthorized reproduction. The security elements can be configured, for example, in the form of a security thread embedded in a banknote, a cover foil for a banknote with a hole, an applied security strip, a self-supporting transfer element or also in the form of a feature region printed directly onto a value document.

A special role in authentication assurance is played by security elements with viewing angle-dependent effects, because these cannot be reproduced even with the most modern copying devices. The security elements are equipped for this purpose with optically variable elements which convey a different image impression to the viewer from different viewing angles, showing, for example, a different color impression or brightness impression, a different perspective view and/or a different graphic motif depending on the viewing angle. In the prior art, for example, kinetic effects, pumping effects, depth effects or flip effects are described as optically variable effects, which are implemented with the aid of holograms, microlenses or micromirrors.

Optically variable security elements were recently proposed in the publication DE 10 2018 005 447 A1, which have two relief structures arranged at different height levels and each supplied with an ink coating. The ink coating of the higher-level relief structure is structured as a grid, so that when viewing the security element, the ink coating of the lower-level relief structure appears in the grid spaces, which makes possible a seamless change from a first to a second appearance when the security element is tilted. In practice, however, the realization of the required fine gridding of the ink coating is technologically very demanding. In addition, due to the grid, the reflected light proportion of the relief structure disposed at a higher or lower level is limited in a manner corresponding to the area region covered by grid elements or grid spaces.

SUMMARY

Proceeding from this, the object of the invention is to propose generic optically variable security elements which are particularly easy to produce and additionally have an attractive, strongly luminous visual appearance.

To achieve the above-mentioned object, the invention includes an optically variable security element with a multicolored reflective area region, which can be used in particular to protect objects of value. The reflective area region shows at least two optically variable effects which can be recognized from different viewing directions, and which appear with different colors. The area extension of the security element defines a plane and a z-axis perpendicular to the area.

The reflective area region includes two independent relief structures, which are arranged at different height levels in the z-direction and form a lower-level relief structure and a higher-level relief structure.

The higher-level relief structure is supplied with a first reflection-enhancing coating following the relief profile, and the lower-level relief structure is supplied with a second reflection-enhancing coating following the relief profile.

The two relief structures overlap in a feature region, wherein a partial overlapping or complete overlapping, i.e. formation in congruent area regions, is possible.

The first reflection-enhancing coating is formed with a—preferably wavelength-dependent—reflection and transmission in the visible spectral range, so that on the one hand the higher-level relief structure—in particular due to the reflection color effect of the first reflection-enhancing coating—shows a first optically variable effect in a first color.

On the other hand, the lower-level relief structure is visible through the first reflection-enhancing coating and—in particular due to the transmission color effect of the first reflection-enhancing coating—shows its second optically variable effect in a second, different color.

The first reflection-enhancing coating is present in the feature region and can be considered at least semitransparent. On the one hand it has a reflective effect and on the other hand it is sufficiently transmissive for the second relief structure or its optically variable effect to be visible.

In the present case, it is particularly advantageous if the first reflection-enhancing coating is formed with a wavelength-dependent reflection and transmission in the visible spectral range. Due to a reflection color effect of the first reflection-enhancing coating, the higher-level relief structure shows the first optically variable effect in the first color and, due to a transmission color effect of the first reflection-enhancing coating, the lower-level relief structure shows the second optically variable effect in the second color.

Due to the wavelength dependency of the first reflection-enhancing coating, the visibility of the two optically variable effects is improved. In particular, the reflectance of the security element is increased. The first reflection-enhancing coating is chosen such that it has high reflectance for the first color and high transmittance for the second color. Thus, the brightness of the two optically variable effects can be increased. For example, the sum of the reflectances for the two colors (and thus the two effects) can be greater than 1.

The higher-level relief structure and/or the lower-level relief structure are particularly advantageously formed by micromirror arrangements with directionally reflective micromirrors. In this case, the micromirrors are formed in particular by micromirrors with non-diffractive effect. Accordingly, they don't produce or utilize any color splitting. Plane mirrors, concave mirrors and/or Fresnel-like mirrors can preferably be used in this case. The lateral dimensions of the micromirrors (or individual elements of a Fresnel mirror) are expediently below 50 μm, advantageously below 20 μm, preferably around 10 μm, i.e. between 7 μm and 13 μm. On the other hand, the lateral dimensions of the micromirrors are also above 2 μm, in particular above 3 μm or even above 5 μm. The pitch of the micromirrors is preferably less than 10 μm, preferably less than 5 μm.

In principle, other relief structures, in particular embossed Fresnel lenses, concave mirrors, hologram structures, nanostructures or diffractive blazed gratings, can also be used instead of micromirrors. Achromatic diffraction gratings, so-called matte structures, can be employed particularly advantageously here, which substantially reflect white light and thus do not disturb the color effect of the coating or any possible ink layers by producing diffraction colors. To produce chromatic colors in transmission and/or reflection, the relief structures can also have sub-wavelength structures, in particular sub-wavelength gratings, which, in combination with the respective reflection-enhancing coating, determine or at least co-determine the color thereof. For example, a relief structure can represent a superimposition of a micromirror structure with sub-wavelength gratings present thereon, wherein the orientation of the micromirrors determines the direction of the reflected light and the sub-wavelength gratings modify the color effect of the reflection-enhancing layer applied to the relief structure.

According to the invention, the optically variable effects of the two relief structures are not congruent; rather, they are at least partially recognizable from different viewing directions. In particular, it is advantageously provided that the first and the second relief structure at least in certain regions reflect incident parallel light into different angle ranges, wherein the two different angle ranges preferably do not overlap and are preferably separated from one another by more than 3°, particularly preferably more than 10°.

The two relief structures are independent relief structures. Accordingly, they can be chosen freely, since they do not depend on one another (in terms of their relief pattern). A relief structure that results solely from coating another relief structure is not an independent relief structure in the present sense. In particular, the relief structures of the area region do not have the same relief pattern, nor the same relief pattern scaled only in height, but the two relief structures are formed differently and with different relief patterns. The two independent relief structures are different in particular. The two relief structures can therefore produce optically variable effects of the same type, for example opposing kinetic effects or spatial representations visible from different viewing directions, but due to the differentness of the relief patterns they will not both produce the same optically variable effect always at the same place.

Specifically, the formation of the higher-level relief structure, in particular the alignment of the micromirrors of the higher-level micromirror arrangement, and/or the formation of the lower-level relief structure, in particular the alignment of the micromirrors of the lower-level micromirror arrangement, advantageously vary in location-dependent manner in order to produce a predetermined motif in each case, in particular a motif with a three-dimensional effect or a kinetic motif. The relief pattern, in particular the alignment of the micromirrors, can be freely chosen and is substantially only determined by the predetermined motifs, but not by the alignment of laterally or vertically adjacent micromirrors.

In the present invention, the first reflection-enhancing coating combines two inherently opposing properties. On the one hand, the first reflection-enhancing coating should have a high reflectance, so that the optically variable effect of the first relief structure is clearly visible, but on the other hand, it should also have the highest possible transmittance, so that the optically variable effect of the second relief structure can become clearly visible.

In principle, reflectance and transmittance are not independent of each other, but the conservation of energy implies that for each material the sum of reflectance R, transmittance T and absorbance A equals 1 (or 100%). Maximum reflection and maximum transmission therefore cannot be achieved at the same time, and even with negligible absorption, the sum of the reflectance and the transmittance cannot be greater than 100%. However, the present inventors have found that this physical limitation can be practically circumvented by maximizing reflectance and transmittance at different wavelengths, respectively. For example, it is indeed possible that a coating in the yellow spectral range has a reflection of 75% (or generally >50%) and in the complementary blue range has a transmission of 75% (or generally >50%). This does not represent a violation of the above-mentioned relationship, since the relationship R+T+A=1 is nevertheless satisfied for each wavelength.

The first reflection-enhancing coating expediently has a transmission of at least 35%, preferably of at least 50%, particularly preferably of at least 60%, at least in a sub-range of the visible spectral range. Furthermore, the first reflection-enhancing coating has a reflection of at least 30%, preferably of at least 50% and particularly preferably of 70% or more, at least in a sub-range of the visible spectral range. As explained, the sub-ranges of particularly high transmission and particularly high reflection are different in the context of the invention, so that transmission and reflection in these ranges can simultaneously assume particularly high values, in particular values of more than 50%.

The first reflection-enhancing coating advantageously includes one or several highly refractive layers, preferably highly refractive dielectric layers, which have a refractive index of at least 1.7, preferably at least 2.0 and particularly preferably at least 2.2, at least in a sub-range of the visible spectrum. For example, highly refractive dielectric layers made of $TiO_2$ or ZnS can be used. Even a single highly refractive dielectric layer can be provided with a thickness such that it reflects in a wavelength-dependent manner. For example, a 70-150 nm thick ZnS (or $TiO_2$) layer reflects in color, while a 40 nm thick layer reflects in white. These can also be combined with lowly refractive layers, for example made of MgF or $SiO_2$, in order to create advantageous multilayer systems. In addition to highly refractive dielectrics, semiconductor materials such as silicon, can also be employed as highly refractive layers. Even if these have higher absorption than highly refractive dielectrics, comparable effects can be produced with thin semiconductor layers.

It has been found that simultaneous very high reflection and very high transmission at different wavelengths can be achieved particularly well with multiple layers, in particular with multilayer systems with several dielectric layers. For example, triple-layer systems that include two highly refractive layers and one lowly refractive intermediate layer are advantageous, such as a layer system made up of a 125 nm thick $TiO_2$ layer, a 70 nm thick $SiO_2$ intermediate layer and a further 125 nm thick $TiO_2$ layer.

The first reflection-enhancing coating can be a (purely) dielectric, reflection-enhancing coating. Further preferably, the first dielectric, reflection-enhancing coating is refractive index-based. It is semitransparent in wavelength-dependent manner, although it can be formed of transparent material with a corresponding refractive index. Particularly preferably, the first dielectric, refractive index-based, reflection-enhancing coating in the security element is directionally neutral for light in transmission. The direction of the incident light and the direction of the light transmitted through the first reflection-enhancing coating are thus the same.

The reflection and transmission color effect of the first reflection-enhancing coating is particularly preferably independent of the viewing angle.

Even thin metal layers can be used with advantage alone or in a multilayer system. A multilayer system is preferably used as the first reflection-enhancing coating, which shows a first color in reflection and a second color in transmission (substantially) independently of the viewing angle. For example, a first reflection-enhancing coating can be formed by a triple-layer system of 25 nm Ag/225 nm SiO$_2$/25 nm Ag, which shows a gold color in reflection and a blue color in transmission, each with a high reflectance and transmittance of more than 50%. In practice, layer systems with a metal/dielectric/metal sequence can often be produced more easily or more cost-effectively on existing installations than dielectric multilayer systems. However, due to the (albeit) low (but still significant) absorption of the thin metal layers, they have a reduced maximum brightness compared to purely dielectric layer systems.

The first reflection-enhancing coating can also be formed by a liquid crystal layer, which is preferably oriented by the higher-level relief structure. Semitransparent nanostructured metal layers, in which, for example, structural colors are generated by additional subwavelength structures in the higher-level relief structure, also come into consideration.

The expedient layer thicknesses of the first reflection-enhancing coating and the sub-layers involved are between approximately ten and several hundred nanometers in all of these configurations. Thin metal layers can also be provided with thicknesses of less than 10 nm.

In the present case, it is particularly advantageous that the first reflection-enhancing coating can be applied over the entire area, since the lower-level relief structure disposed thereunder remains visible through the coating due to its semi-transparency, as explained in more detail below.

According to the invention, the second reflection-enhancing coating has the highest possible reflectance, which is advantageously at least 50%, preferably at least 75%, particularly preferably at least 80% or even at least 85%. This high reflectance is present at least in part of the visible spectrum, advantageously in the color range in which the color of the second optically variable effect is desired. However, the second reflection-enhancing coating can advantageously also be formed to be highly reflective in the entire visible spectral range, however, since a desired color effect can already be produced by colored transmission of the first reflection-enhancing coating and/or an intermediate ink layer and/or a dyed embossing lacquer layer.

The second reflection-enhancing layer is preferably formed as a reflective metallic coating. In particular, the reflection can be so high that the second reflection-enhancing layer is opaque in transmission, i.e. has an optical density of at least 1.0, preferably 2.0 or more. Layers of silver and aluminum, for example, come into consideration as layers that are highly reflective in the entire visible spectral range. In other advantageous embodiments, colored metallizations are employed, in particular a gold-colored metallization (for example made of Au or alloys such as Al—Cu and the like) or a copper-colored metallization. In order to achieve a desired color effect, the second reflection-enhancing layer can also be composed of a combination of a metallization and a glazing ink layer. Thin-film systems also come into consideration as the second reflection-enhancing layer, for example color-shifting triple-layer structures of absorber, dielectric and reflector layer, with which blue or green reflective color contributions can also be realized in particular, which are difficult to realize with individual metal layers.

The first and second reflection-enhancing layers are preferably matched to one another in order to obtain overall high reflection of the security element from both relief structures and thus a bright representation of both optically variable effects. In particular, the reflection of the second reflection-enhancing layer is therefore advantageously high at least in the spectral range in which the first reflection-enhancing layer has high transmission, since the brightness of the optically variable effect of the lower-level relief structure results from the transmission of the first reflection-enhancing layer and the reflection of the second reflection-enhancing layer.

If, for example, the first reflection-enhancing layer has a reflectance $R_{Green}(1)=75\%$ in the green range and a transmittance $T_{Red}(1)=90\%$ in the red range, and the second reflection-enhancing layer has a reflectance at least in the red range (or in the entire visible spectral range) of $R_{Red}(2)=90\%$, given the negligibility of absorption and the absence of further ink layers, the reflectance $R_H$ of the higher-level relief structure in the green range results in $$R_{HL,Green}=R_{Green}(1)=75\%,$$

and the reflectance $R_T$ of the higher-level relief structure in the red range results in $$R_{TL,Red}=T_{Red}(1)*R_{Red}(2)*T_{Red}(1)=73\%,$$

so that both optically variable effects appear with very high and mutually comparable brightness. When determining the brightness of the optically variable effect of the lower-level relief structure, it must be taken into account that the light reflected by the second reflection-enhancing layer passes through the first reflection-enhancing layer again (see, for example, FIG. 2), so that its transmittance must be taken into account twice.

In the example stated, when neglecting the absorption for the first reflection-enhancing layer, there holds for the transmittance in the green range $T_{Green}(1)=25\%$ and for the reflectance in the red range $R_{Red}(1)=10\%$, so that at the same wavelength $$R_{Green}(1)+T_{Green}(1)=75\%+25\%=100\%, \text{ and}$$

$$R_{Red}(1)+T_{Red}(1)=90\%+10\%=100\%;$$

the conservation of energy is therefore fulfilled. Nevertheless, there holds for the reflection and transmission of the first reflection-enhancing layer at different wavelengths $$R_{Green}(1)+T_{Red}(1)=75\%+90\%>100\%,$$

which makes possible high reflectivity for both relief structures with $$R_{HL,Green}+R_{TL,Red}=75\%+73\%>100\%.$$

Advantageously, the matching of the first and second reflection-enhancing layers provides that the security element, at least in a sub-range, directs light of a first wavelength range of the visible spectrum with a reflectance R1 into a first viewing angle range, and directs light of a second wavelength range of the visible spectrum with a reflectance R2 into a second viewing angle range, wherein there holds R1+R2>1 (or 100%). In the example above, the first wavelength range is the green spectral range, the second wavelength range is the red spectral range and R1=0.75, R2=0.73, so that there holds R1+R2=1.48>1.

Advantageously, the light transmitted through the first reflection-enhancing layer does not change its direction or changes its direction only slightly, in order to ensure that the optically variable effect of the higher-level relief structure does not shine through onto the lower-level relief structure. In order to achieve this, the relief-forming layers and the layers adjoining the reflection-enhancing layers have a similar or even the same refractive index, i.e. a difference in refractive index of less than 0.25, preferably less than 0.1 and particularly preferably less than 0.05.

One or several light-transmissive ink layers can be provided between the first and the second relief structure in order to influence the color impression of the optically variable effect of the second relief structure. Such a light-transmissive ink layer can in particular not be structured in height, i.e. it can be formed as a flat layer, or it can be formed by a dyed relief-forming layer, for example a dyed embossing lacquer layer.

The different height levels at which the two relief structures are arranged advantageously have a distance in the z-direction of between 5 µm and 100 µm, preferably between 10 µm and 50 µm. The small vertical distance of the structures involved is not perceptible when viewing the security element. On the other hand, the vertical distance is large enough to prevent any interference effects from occurring in the intermediate layer or layers, so that the coloring of the security element is not disturbed by any interference colors. Interference effects are also prevented by the height profiles of the relief structures extending in non-conforming manner, which also leads to a locally constantly changing vertical spacing of the relief structures. The base area of the relief structure forms the reference point for the height level of a relief structure, for example at the base point of a micromirror embossing.

In some configurations, a light-transmissive ink layer can expediently also be provided above the first reflection-enhancing layer in order to influence the color impression of the optically variable effect of the first relief structure. For example, a highly refractive dielectric layer can be covered with a glazing chromatic ink. Since such an ink layer also influences the color and brightness of the optically variable effect of the second relief structure, light colors are preferably employed for such ink layers, which also transmit the desired color of the second relief structure as strongly as possible, such as yellow or a very light red, blue or green in each case.

With reference to the area coverage of the reflection-enhancing layers, in an advantageous embodiment both reflection-enhancing layers are applied to the area pattern in a non-gridded manner and in particular even over the entire area. A particular advantage of the configuration according to the invention consists precisely in the fact that the optically variable effect of the lower-level relief structure is visible despite a first reflection-enhancing coating that is present in non-gridded form or over the entire area.

In a further development, the second reflection-enhancing layer can also be provided only in certain regions and thereby form negative identifiers, in particular in the form of numbers, symbols and the like, in the security element. Additionally or alternatively, the first reflection-enhancing coating can also be present only in certain regions. According to the invention, however, the regions in which the two different reflection-enhancing coatings are provided must overlap at least in certain regions in the feature region. In advantageous embodiments, the reflection-enhancing coatings are not provided over the entire area, but in sub-regions that are completely or almost congruent. In particular, a negative mark can be executed in such a manner that both reflection-enhancing coatings are left out congruently in the form of text, symbols, value numbers and the like. The first reflection-enhancing layer is therefore advantageously present in non-gridded manner in the feature region, i.e. without gridding, but possibly with individual negative features. In a preferred configuration, the first reflection-enhancing layer is even present over the entire area in the feature region, i.e. without gridding and gaps.

Known structuring methods can be utilized for particularly good registration of the two layers, in which, for example, a reflection-enhancing coating that has already been structured is employed as a mask for structuring the other layer.

In particular when using a dielectric first reflection-enhancing layer, it can be advantageous to suppress the reflectance or the color effect in certain regions and thus, for example, to imitate a gap in the layer. For this purpose, corresponding modulation structures can be provided in the higher-level relief structure, which locally reduce the reflectance or the color effect of the applied layer. So-called moth-eye structures can advantageously be employed for this purpose, which can be present, for example, as regular or irregular subwavelength structures.

Merely for the sake of completeness, it should be mentioned that the relief structure that is closer to the viewer is the higher-level relief structure The two optically variable effects show themselves to the viewer from one viewing side (in this sense from above).

The invention further includes a data carrier with a security element of the type described. The data carrier can be in particular a value document, such as a banknote, in particular a paper banknote, a polymer banknote or a foil composite banknote, a share, a bond, a deed, a voucher, a check, a high-quality admission ticket, but also an identification card, such as a credit card, a bank card, a cash card, an authorization card, a personal identity card or a passport personalization page. The lower-level relief structure is generally closer to a surface of the data carrier than the higher-level relief structure, which is closer to the viewer's eye. In an expedient variant, the security element is arranged in an opaque region of the data carrier.

The invention also includes a method for manufacturing an optically variable security element with a reflective area region that shows at least two optically variable effects which can be recognized from different viewing directions and which appear with different colors, and in particular makes available a method for manufacturing a security element of the type described above, in which a carrier is made available, the area extension of which defines a plane and a z-axis perpendicular thereto, the carrier is supplied with a reflective area region which includes two independent relief structures which are arranged at different height levels in the z-direction and form a lower-level relief structure and a higher-level relief structure, the higher-level relief structure is supplied with a first reflection-enhancing coating following the relief profile and the lower-level relief structure is supplied with a second reflection-enhancing coating following the relief profile, the two relief structures are formed to be overlapping in a feature region, the first reflection-enhancing coating in the feature region is formed with a—preferably wavelength-dependent—reflection and transmission in the visible spectral range, so that the higher-level relief structure—in particular due to the reflection color effect of the first reflection-enhancing coating—shows a first optically variable effect in a first color, and the lower-level relief structure shows a second optically variable effect through the first reflection-enhancing coating, wherein—in particular due to the transmission color effect of the first reflection-enhancing coating—the second optically variable effect shows itself in a second, different color.

BRIEF DESCRIPTION OF THE DRAWINGS

Further embodiment examples as well as advantages of the invention will be explained hereinafter with reference to the figures, in the representation of which a rendition that is true to scale and proportion has been dispensed with in order to increase clarity.

There are shown.

DETAILED DESCRIPTION OF VARIOUS EMBODIMENTS

Figure 1:
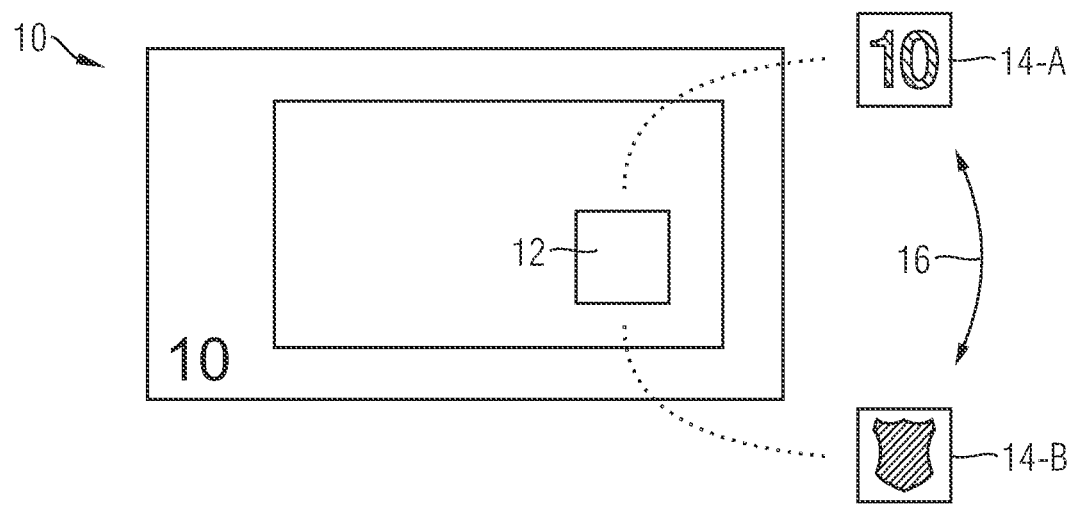
FIG. 1 a schematic representation of a banknote with an optically variable security element according to the invention, FIG. 2 a detail of a security element according to the invention in cross section, FIG. 3 the transmittance and the reflectance of the first reflection-enhancing coating of FIG. 2, FIG. 4 another embodiment example of the invention, wherein the layers described in connection with FIG. 2 have been applied to the same side of a carrier foil, FIGS. 5(a) to 5(e) schematically the appearance of the security element of FIG. 4 in a plan view from different viewing directions, and FIG. 6 a further embodiment example of the invention.

The invention will now be explained by the example of security elements for banknotes. FIG. 1 shows a schematic representation of a banknote 10 with an optically variable security element 12 according to the invention in the form of an adhesively bonded transfer element. It goes without saying, however, that the invention is not limited to transfer elements and banknotes but can be used for all types of security elements, for example for labels on goods and packagings or for securing documents, identity documents, passports, credit cards, health cards and the like. In the case of banknotes and similar documents, in addition to transfer elements (such as patches or strips, each with or without their own carrier layer), security threads or security strips, for example, are also conceivable.

Despite its flat formation, the security element 12 shown in FIG. 1 conveys to the viewer a three-dimensional impression and at the same time shows a binary change in color and effect when the banknote 10 is tilted. From a first viewing direction, the security element 12 shows a first motif 14-A that appears to bulge out of the plane of the banknote 10, specifically for example a curved representation of the value number "10" which appears with a first color, for example a luminous yellow. From a second viewing direction, the security element 12 shows a second motif 14-B that appears to bulge out of the plane of the banknote 10, for example a curved representation of a coat of arms that appears with a second color, for example a luminous blue.

Upon tilting 16 the banknote 10 or a corresponding change in the viewing direction, the appearance of the security element 12 suddenly switches from the first to the second appearance or, upon tilting back, from the second to the first appearance. The change of the motif (value number or coat of arms) and the color (yellow or blue) takes place simultaneously and without an intermediate or transitional stage in which both motifs or colors would be visible at the same time, or one motif would be visible in the color of the other motif. The appearance therefore switches seamlessly between two appearances 14-A, 14-B and is therefore referred to as a binary color and effect change.

Security elements with such appearances are already known in principle from the publication DE 10 2018 005 447 A1. However, compared to the security elements described there, the security element described presently can be manufactured more easily and more cost-effectively and additionally shows the two optical effects with higher luminosity and therefore also with a higher attention value and recognition value.

The particular structure of optically variable security elements according to the invention will now be explained in more detail with reference to FIG. 2, which shows a detail of the security element 12 schematically in cross section.

The security element 12 includes a flat, transparent carrier foil 18, the area expansion of which defines an x-y plane and a z-axis standing perpendicularly thereon.

The carrier foil 18 carries a multicolored reflective area region 20, which includes two relief structure regions 24, 34, which are arranged at two specific, different height levels in the z-direction. Since the security element of FIG. 2 is adapted for viewing in reflection from the positive z-direction, the relief structure 34 disposed closer to the viewer 40 is referred to as the higher-level relief structure and the relief structure 24 disposed further away from the viewer 40 is referred to as the lower-level relief structure.

In the embodiment example, the two relief structure regions each represent micromirror embossings or micromirror arrangements 24, 34 which are each formed from a multiplicity of micromirrors which are inclined with respect to the x-y plane and have lateral dimensions of approximately 10 µm. The local angles of inclination of the micromirrors are chosen exactly so that the relief structures of the micromirror arrangements 24, 34 produce a desired optical appearance after the reflection-enhancing coating.

Specifically, the angles of inclination of the micromirrors in the embodiment example are chosen so that the micromirror arrangement 34 produces the curved representation of the value number "10" in a viewing angle range of +5° to +20° (viewing position 40-A) with reference to the surface normal 42, and the micromirror arrangement 24 produces the curved representation of the coat of arms in a viewing angle range of −5° to −20° (viewing position 40-B).

To produce the desired color impressions, the lower-level micromirror arrangement 24 is supplied over the entire area with a second reflection-enhancing coating 26 in the form of a highly reflective opaque metal layer, for example an opaque aluminum layer with a reflectivity of approximately 90%. The higher-level micromirror arrangement 34 is supplied over the entire area with a first reflection-enhancing coating 36 following the relief profile, which is semitransparent and formed with a wavelength-dependent reflection and transmission in the visible spectral range, as illustrated in more detail in FIG. 3.

Figure 3:
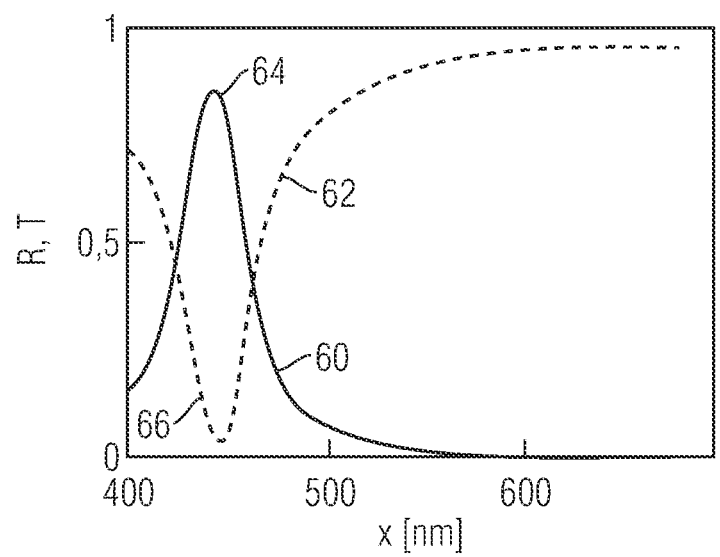

FIG. 3 shows schematically the transmittance (continuous curve 60) and the reflectance (dashed curve 62) of the reflection-enhancing coating 36 in dependence on the wavelength λ. As can be seen from FIG. 3, the transmittance of the coating 36 is particularly high in the blue spectral range (peak 64) and even exceeds the 50% mark there. Accordingly, the reflectance of the coating 36 in the blue spectral range is very low (dip 66). Conversely, the reflectance of the coating 36 is particularly high in the yellow and red spectral range and also clearly exceeds the 50% mark there, wherein again correspondingly the transmittance of the coating in this spectral range is very low.

As explained in more detail above, the spectral separation of reflection and transmission makes it possible for the reflection-enhancing coating 36 to have a reflectance of more than 50% in the yellow spectral range on the one hand and therefore produce a bright, golden-yellow reflection color, and on the other hand to have a transmittance of more than 50% outside the yellow spectral range and therefore to have a bright, blue transmission color.

The micromirror arrangements 24, 34 are each embossed into a transparent embossing lacquer layer 22, 32 applied to the carrier foil 18 and, after the respective reflection-enhancing coating 26, 36 has been applied, are leveled with a transparent top-coat lacquer layer 28 or 38, respectively. In this case, the top-coat lacquer layers preferably have substantially the same refractive index as the embossing lacquer layers 22, 32. The layer structure is applied to the banknote paper of the banknote 10 or the substrate of another data carrier, for example with the aid of an adhesive layer 44.

When white light 50 is incident perpendicularly, the micromirrors of the higher-level micromirror arrangement 34 are at the glancing angle for the observer from the viewing direction 40-A, said micromirrors producing the curved representation of the value number "10", wherein the first reflection-enhancing coating 36 gives the image impression a bright, golden yellow reflection color 52. Due to the semitransparency of the reflection-enhancing coating 36, the micromirrors of the micromirror arrangement 24 are likewise perceptible in principle, but their alignment is far removed from the glancing angle and they therefore appear inconspicuous from the viewing direction 40-A and practically do not contribute to the image impression. Overall, the viewer from the viewing direction 40-A thus sees substantially the golden-yellow luminous appearance 14-A of the curved value number "10" produced by the micromirror arrangement 34.

From the viewing direction 40-B, the micromirrors of the lower-level micromirror arrangement 24 are in the glancing angle for the viewer, which produce the curved representation of the coat of arms. The semitransparent coating 36 transmits the blue portion of the incident white light 50 as a blue transmission color 54. The blue transmission color 54 is reflected by the opaque aluminum coating 26, which substantially acts as a mirror, unchanged in color as a blue reflection 56 in the viewing direction 40-B. The micromirrors of the higher-level micromirror arrangement 34 are likewise perceptible in principle, but their alignment is far removed from the glancing angle, and they therefore appear inconspicuous from the viewing direction 40-B and practically do not contribute to the image impression. Overall, from the viewing direction 40-B the viewer thus substantially sees the blue luminous appearance 14-B of the curved coat of arms produced by the micromirror arrangement 24.

Both the yellow luminous appearance of the curved value number "10" and the blue luminous appearance 14-B of the curved coat of arms have an intensity of more than 50% of the incident light intensity, so that both color impressions appear extraordinarily strongly luminous and striking to the viewer.

In conventional configurations, in which the lower-level relief structure is only visible through a gridded ink coating of the higher-level relief structure, the area coverage of the grid limits the relative brightness of the two relief structures, so that at most one of the brightnesses of the two appearances can be above 50%. As already explained in detail above, the increased brightness in the present invention is made possible by spectrally separating the wavelength ranges of maximum reflection and maximum transmission.

While it is physically impossible for the reflectance and transmittance to be greater than 50% at the same wavelength at the same time, spectral separation can result in the reflection in one color (here e.g. yellow) and the transmission in another color (here e.g. blue) each being greater than 50%. If the transmitted light is then reflected by a highly reflective layer with almost no loss, the security element as a whole can represent both the first optically variable effect in the first color (yellow) and the second optically variable effect in the second color (blue) with a reflectance of more than 50%.

According to the invention, however, it is not absolutely necessary for both reflection and transmission to be above 50%, since, on the one hand, even with smaller values, a higher brightness can be achieved than in conventional configurations, and, on the other hand, due to the semitransparency of the first reflection-enhancing coating independent of the brightness, in any case, there is no need for fine gridding of the coating of the higher-level relief structure, and the security element can therefore be manufactured more easily and cost-effectively.

Specifically, a single layer of $TiO_2$ or ZnS with a layer thickness of approximately 10 nm to a few 100 nm can be used, for example, for the semitransparent reflection-enhancing coating 36 of the higher-level relief structure. For example, with a 125 nm thick highly refractive coating of $TiO_2$, employing a refractive index of 1.41 for the surrounding embossing or protective lacquer, a reflectivity of over 40% in the green range and at the same time a very high transmission in the blue and red ranges, which can be 90% or more, is obtained.

Multiple layers are particularly well suited for the semitransparent reflection-enhancing coating 36, since these can be adapted specifically for very high reflection and very high transmission at different wavelengths at the same time. For example, triple dielectric layers can be used, such as a sandwich of two 125 nm thick $TiO_2$ layers separated by a 70 nm thick $SiO_2$ intermediate layer. Such a coating has almost 80% reflection at wavelengths around 500 nm with a still very high transmission of more than 90%, particularly in the red spectral range.

Figure 2:
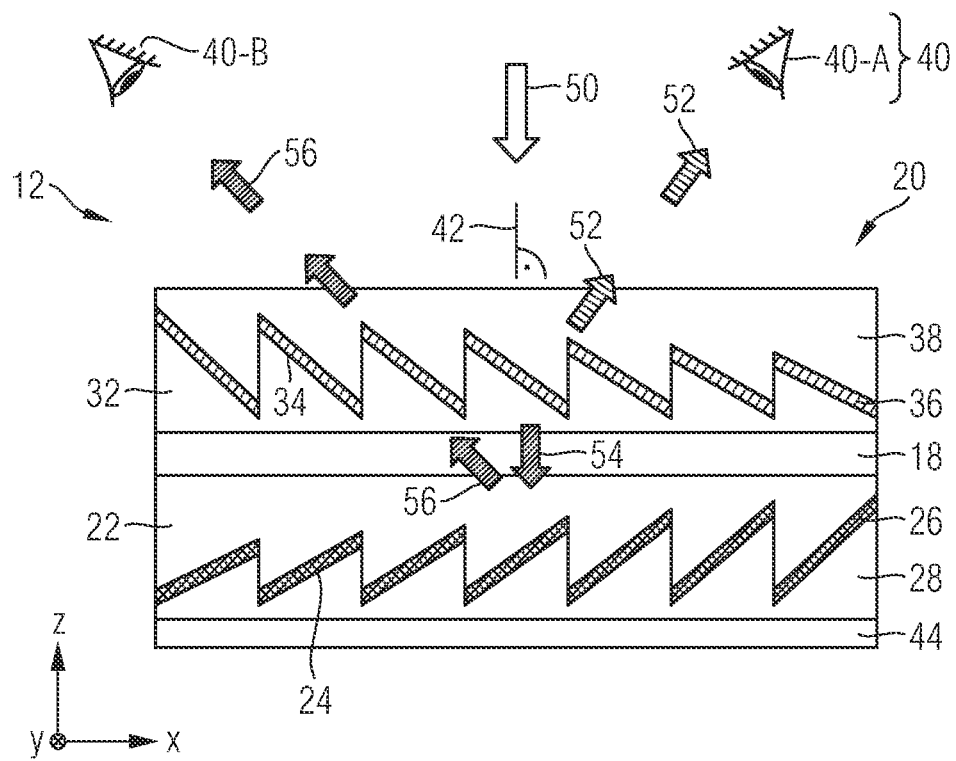

Coming back to the representation of FIG. 2, the color impression of the second relief structure 24 and thus of the second optically variable effect can be modified in a number of ways. For example, instead of an aluminum coating, a metal reflecting in color, such as copper or gold, can be employed for the second reflection-enhancing coating. Alternatively or additionally, a light-transmissive ink layer can be arranged between the two reflection-enhancing coatings 26 and 36, as illustrated in FIG. 6. Such a light-transmissive ink layer can in particular be formed so as not be structured in height and can be applied, for example, as a flat layer to the upper or lower surface of the carrier foil 18. Further alternatively or additionally, one or both of the embossing lacquers 22, 32 can also be dyed.

The reflection color of the first relief structure 34 is not changed by these measures. The color impression of the second relief structure 24 is modified, however, and then results from a combination of the transmission color of the first reflection-enhancing coating, the reflection color of the second reflection-enhancing coating and, possibly, other color effects of the ink layers disposed between the relief structures and/or dyed embossing lacquers.

Figure 4:
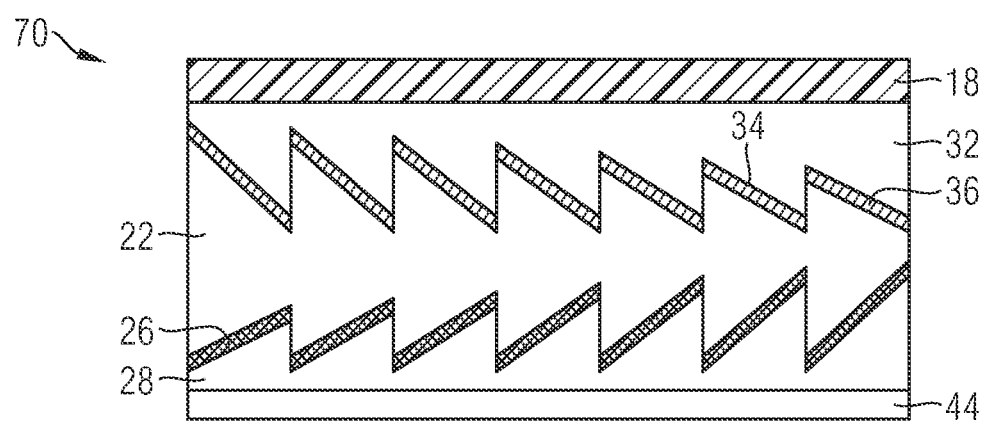

As a further embodiment example of the invention, FIG. 4 shows a security element 70 in which the layers described in connection with FIG. 2 have been applied to the same side of a carrier foil 18. Starting from the carrier foil 18, the security element 70 includes a first transparent embossing lacquer layer 32 with an embossed, higher-level micromirror structure 34, a first reflection-enhancing coating 36, a second transparent embossing lacquer layer 22 applied to the coating 36 with an embossed, lower-level micromirror structure 24, a second reflection-enhancing coating 26, a top-coat lacquer layer 28, and finally an adhesive layer 44 for transferring the security element 70 to a target substrate. The carrier foil 18 is preferably formed to be releasable and is pulled off after the security element 70 has been transferred. Alternatively, in the case of a transparent formation, the carrier foil 18 can also remain in the transferred layer composite.

In the embodiment example of FIG. 4, the first reflection-enhancing coating 36 is formed by a triple-layer dielectric structure made up of a 125 nm thick $TiO_2$ layer, a 70 nm thick $SiO_2$ layer and a 125 nm thick $TiO_2$ layer. The coating 36 shows a green reflection color with a reflectivity of almost 80% and a red transmission color with a transmittance of well over 80%. A highly reflective aluminum coating is used as the second reflection-enhancing coating 26, which substantially acts as a mirror area without color contribution of its own. The security element 70 therefore shows the optically variable effects described below from the respective viewing directions with a luminous green or luminous red color.

It is particularly noteworthy here that the sum of the reflectance R1 of the higher-level relief structure 34 in the green range and the reflectance R2 of the lower-level relief structure 24 in the red range is greater than one (or 100%), specifically each of the two degrees of reflection is even greater than 0.5 (or 50%). This is not physically possible with conventional configurations, which are based on the partial transmission of incident radiation through the gridding of an ink layer. For example, with 50% gridding of an opaque, reflective coating of the higher-level relief structure, averaged over the entire area, no more than 50% of the incident light can be reflected per representation, so that at most a sum of R1+R2=1 can be achieved. The security element 70 of FIG. 4 therefore appears to be particularly strongly luminous compared to conventional configurations.

With reference to the plan views of FIGS. 5 (*a*) to (*e*), the tilt angles of the micromirrors of the lower-level micromirror arrangement 24 in the feature region are chosen in the security element 70 in such a manner that they produce a red rolling bar effect, i.e. a bright red bar 72 which, depending on the direction of tilting, appears to run up or down along the feature region of the security element 70 when the security element is tilted, as indicated by the arrows in FIGS. 5(*a*) to (*e*) for one of the two directions of movement. The angles of inclination of the micromirrors of the higher-level micromirror arrangement 34 are chosen in such a manner that they simultaneously produce an opposing green rolling bar effect in the feature region, i.e. a bright green bar 74 that, when the security element is tilted, runs respectively contrary to the red bar 72 of the lower-level micromirror arrangement 24.

Due to the semitransparency of the coating 36 there are always, even in the overlapping position in which both bars 72, 74 overlap each other partly or completely, both the green bar 74 of the higher-level micromirror arrangement 34 and the red bar 72 of the lower-level micromirror arrangement 24 are visible, so that the two bars 72, 74 seem to run through each other for the viewer. In the overlapping position represented in FIG. 5(*c*), the viewer sees the red and green color of the two micromirror arrangements 24, 34 in the same place, so that additive color mixing results in a very bright mixed color. The angle difference between the tilt angles at which one of the bars lights up red or green increases here from the middle of the security element 70 upwards or downwards and is, for example, 10° or even more at the upper or lower edge.

In the manufacture of a structure shown in FIG. 4, two advantageous variants are possible: In a first variant, the second embossing lacquer layer 22 can be applied directly to the first reflection-enhancing coating 36 and embossed. In this case, the embossing lacquer can be dyed in an advantageous embodiment and then gives the light reflected at the second reflection-enhancing coating 26 an additional color contribution. In another variant, the second embossing lacquer layer 22 with its embossing 24 and reflection-enhancing coating 26 can also be produced on another carrier foil and then laminated onto the first carrier foil 18 with the relief structure 34 and its reflection-enhancing coating 36. In an advantageous embodiment, a dyed laminating adhesive can be employed in order to make available an additional color contribution.

Alternatively, a transparent laminating adhesive and an additional ink layer can also be employed for this purpose.

As a further embodiment example, which represents a modification of the configuration in FIG. 2, a security element 80 is shown in FIG. 6, the structure of which largely corresponds to the structure of the security element 12 in FIG. 2. In this embodiment example, however, a glazing ink layer 82 is provided on the lower side of the carrier foil 18, which makes available an additional color contribution for the light reflected on the second reflection-enhancing coating 26. Like in FIG. 2, transparent embossing lacquer layers 22, 32 were then applied to the carrier foil 18 pre-coated in this manner, embossed with the desired relief pattern and each supplied with a reflection-enhancing coating 26, 36.

The upper side of the arrangement is laminated onto a carrier foil 86 with a release layer 88 via a laminating lacquer 84, and the lower side of the arrangement is supplied with an adhesive layer 44 for transfer to a target substrate. Such an arrangement is particularly suitable for manufacturing a patch product by punching and weeding, wherein the structure from the release layer 88 to the carrier foil 86 is cut through with a punching tool and removed outside of the patch region to be transferred.

In the representation of FIG. 6, regions that have already been weeded are indicated at the top left and right edge, in which only the carrier foil 86 has remained. It goes without saying that the ink layer 82 can also be dispensed with if its color effect is not required for the desired appearance.

The invention claimed is:

1. An optically variable security element for protecting objects of value, the area extension of which defines a z-axis perpendicular thereto, with a reflective area region that shows at least two optically variable effects which can be recognized from different viewing directions, and which appear with different colors, wherein the reflective area region includes two independent relief structures comprising micromirror arrangements with directionally reflective micromirrors, which are arranged at different height levels in the z-direction and form a lower-level and a higher-level relief structure, the higher-level relief structure is supplied with a first reflection-enhancing coating following the relief profile, and the lower-level relief structure is supplied with a second reflection-enhancing coating following the relief profile;

the two relief structures overlap in a feature region, and the first reflection-enhancing coating is formed in the visible spectral range with a wavelength-dependent reflection and transmission in the visible spectral range, so that the higher-level relief structure provides a first optically variable effect visible for a viewer in a first color and in a first viewing angle range, and the lower-level relief structure provides a second optically variable effect through the first reflection-enhancing coating, wherein the second optically variable effect is visible for the viewer in a second, different color and in a second viewing angle range different from the first viewing angle range, wherein the first reflection-enhancing layer is present in the feature region in a non-gridded manner.

2. The security element according to claim 1, wherein the first reflection-enhancing coating has a wavelength-dependent reflection and a wavelength-dependent transmission in the visible spectral range, so that due to the reflection color effect of the first reflection-enhancing coating, the higher-level relief structure shows the first optically variable effect in the first color, and due to the transmission color effect of the first reflection-enhancing coating, the lower-level relief structure shows the second optically variable effect in the second color.

3. The security element according to claim 1, wherein the two independent relief structures are formed differently.

4. The security element according to claim 1, wherein the first reflection-enhancing coating has a transmission of at least 35% at least in a sub-range of the visible spectral range.

5. The security element according to claim 1, wherein the first reflection-enhancing coating has a reflection of at least 30%, at least in a sub-range of the visible spectral range.

6. The security element according to claim 1, wherein the first reflection-enhancing coating includes one or several highly refractive layers, highly refractive dielectric layers, which have a refractive index of at least 1.7, at least in a sub-range of the visible spectrum.

7. The security element according to claim 1, wherein the second reflection-enhancing coating has a reflectance of at least 50%, at least in a sub-range of the visible spectrum, that the second reflection-enhancing coating is formed to be opaque with an optical density of more than 1.0.

8. The security element according to claim 1, wherein the security element at least in a sub-region directs light of a first wavelength range of the visible spectrum with a reflectance R1 into a first viewing angle range and directs light of a second wavelength range of the visible spectrum with a reflectance R2 into a second viewing angle range, wherein there holds R1+R2>1.

9. The security element according to claim 1, wherein the first and/or second reflection-enhancing layer is present in the feature region in a non-gridded manner, over the entire area.

10. The security element according to claim 1, wherein one or several light-transmissive ink layers are provided between the first and the second relief structure in order to influence the color impression of the optically variable effect of the second relief structure.

11. The security element according to claim 1, wherein one or several light-transmissive ink layers are provided above the first reflection-enhancing layer in order to influence the color impression of the optically variable effects of the first and the second relief structure.

12. The security element according to claim 1, wherein
the transmission color effect of the first reflection-enhancing coating determines the second color; or
the transmission color effect of the first reflection-enhancing coating determines the second color together with a reflection color effect of the second reflection-enhancing coating and/or with at least one of the light-transmissive ink layers; or
a reflection color effect of the second reflection-enhancing coating and/or the color effect of at least one of the light-transmissive ink layers determines the second color.

13. The security element according to claim 1, wherein in a certain region the first relief structure reflects incident parallel light into a first angle range and the second relief structure reflects the incident parallel light into a second angle range,
wherein the first angle range and the second angle range do not overlap.

14. The security element according to claim 1, wherein a formation of the higher-level relief structure and/or a formation of the lower-level relief structure, varies in location-dependent manner in order to produce a predetermined motif in each case, a motif with a three-dimensional effect or a kinetic motif.

15. A data carrier with an optically variable security element according to claim 1.

16. A method for manufacturing an optically variable security element with a reflective area region that shows at least two optically variable effects which can be recognized from different viewing directions, and which appear with different colors, according to claim 1, in which
a carrier is made available, the area extension of which defines a plane and a z-axis perpendicular thereto,
the carrier is supplied with a reflective area region which includes two independent relief structures which are arranged at different height levels in the z-direction and form a lower-level and a higher-level relief structure,
the higher-level relief structure is supplied with a first reflection-enhancing coating following the relief profile, and the lower-level relief structure is supplied with a second reflection-enhancing coating following the relief profile,
the two relief structures are formed to overlap in a feature region,
the first reflection-enhancing coating in the feature region is formed with a wavelength-dependent reflection and transmission in the visible spectral range, so that
the higher-level relief structure due to the reflection color effect of the first reflection-enhancing coating, shows a first optically variable effect in a first color, and
the lower-level relief structure shows a second optically variable effect through the first reflection-enhancing coating, which, due to the transmission color effect of the first reflection-enhancing coating, shows itself in a second, different color.

* * * * *